(12) United States Patent
VanBlon et al.

(10) Patent No.: US 11,265,509 B2
(45) Date of Patent: Mar. 1, 2022

(54) COMPUTING SYSTEM

(71) Applicant: Lenovo (Singapore) Pte. Ltd., Singapore (SG)

(72) Inventors: Russell Speight VanBlon, Raleigh, NC (US); Robert James Norton, Jr., Raleigh, NC (US); Robert James Kapinos, Durham, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/914,930

(22) Filed: Jun. 29, 2020

(65) Prior Publication Data
US 2021/0409644 A1 Dec. 30, 2021

(51) Int. Cl.
*H04N 7/14* (2006.01)
*G06F 1/16* (2006.01)
*G05B 15/02* (2006.01)

(52) U.S. Cl.
CPC ............ *H04N 7/144* (2013.01); *G05B 15/02* (2013.01); *G06F 1/1681* (2013.01); *G06F 1/1686* (2013.01)

(58) Field of Classification Search
USPC .............................................. 348/14.02–14.09
See application file for complete search history.

(56) References Cited

U.S. PATENT DOCUMENTS

| | | | | |
|---|---|---|---|---|
| 8,909,008 | B1 * | 12/2014 | Tzeng | G02B 6/3604 385/26 |
| 2002/0044216 | A1 * | 4/2002 | Cha | G06F 1/1616 348/376 |
| 2018/0007280 | A1 * | 1/2018 | Case, Jr. | H04N 5/23293 |

* cited by examiner

*Primary Examiner* — Maria El-Zoobi
(74) *Attorney, Agent, or Firm* — Brian J. Pangrle

(57) ABSTRACT

A system can include a first housing that includes a display and an adjustable camera, where the display includes a normal vector and where the adjustable camera includes an optical axis; a second housing that includes a keyboard, a processor and memory accessible to the processor; and a hinge assembly that rotatably couples the first housing and the second housing, where rotation of the first housing with respect to the second housing actuates adjustment of the adjustable camera to adjust the optical axis with respect to the normal vector.

22 Claims, 15 Drawing Sheets

COMPUTING SYSTEM

TECHNICAL FIELD

Subject matter disclosed herein generally relates to technology for computing systems or other systems.

BACKGROUND

Various types of systems, display systems, computing and display systems, etc. exist that have one or more cameras for image capture.

SUMMARY

A system can include a first housing that includes a display and an adjustable camera, where the display includes a normal vector and where the adjustable camera includes an optical axis; a second housing that includes a keyboard, a processor and memory accessible to the processor; and a hinge assembly that rotatably couples the first housing and the second housing, where rotation of the first housing with respect to the second housing actuates adjustment of the adjustable camera to adjust the optical axis with respect to the normal vector. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
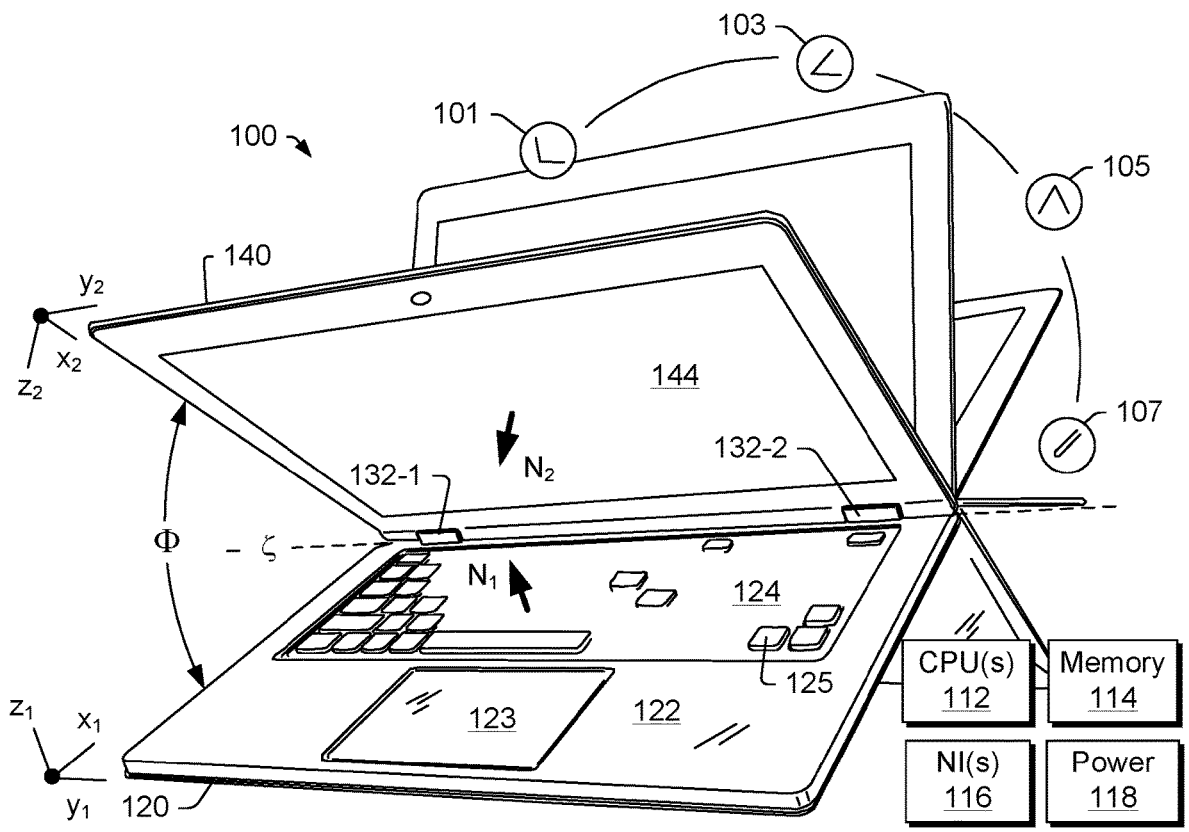
FIG. 1 is a diagram of an example of a system.
Figure 1:
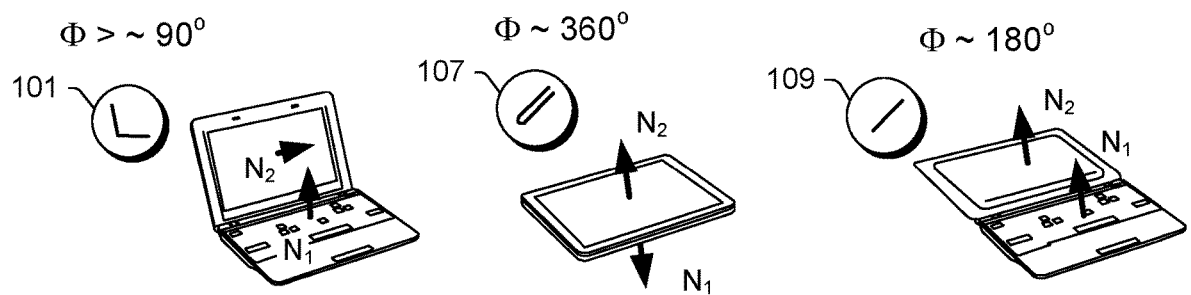

FIG. 1 shows an example of a system 100 that includes a keyboard housing 120 and a display housing 140 that are pivotable with respect to each other via movement about one or more hinges 132-1 and 132-2 (e.g., hinge assemblies). The system 100 may be a system such as, for example, a computing system (e.g., an information handling device, etc.).

As an example, the system 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the system 100, the keys 125 may be contacted by the users hand or hands. A user may perceive the springiness of the keys 125 as being somewhat undesirable. For example, springy keys may interfere with a user's ability to comprehend or sense force that is sufficient to grasp the system 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the system 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
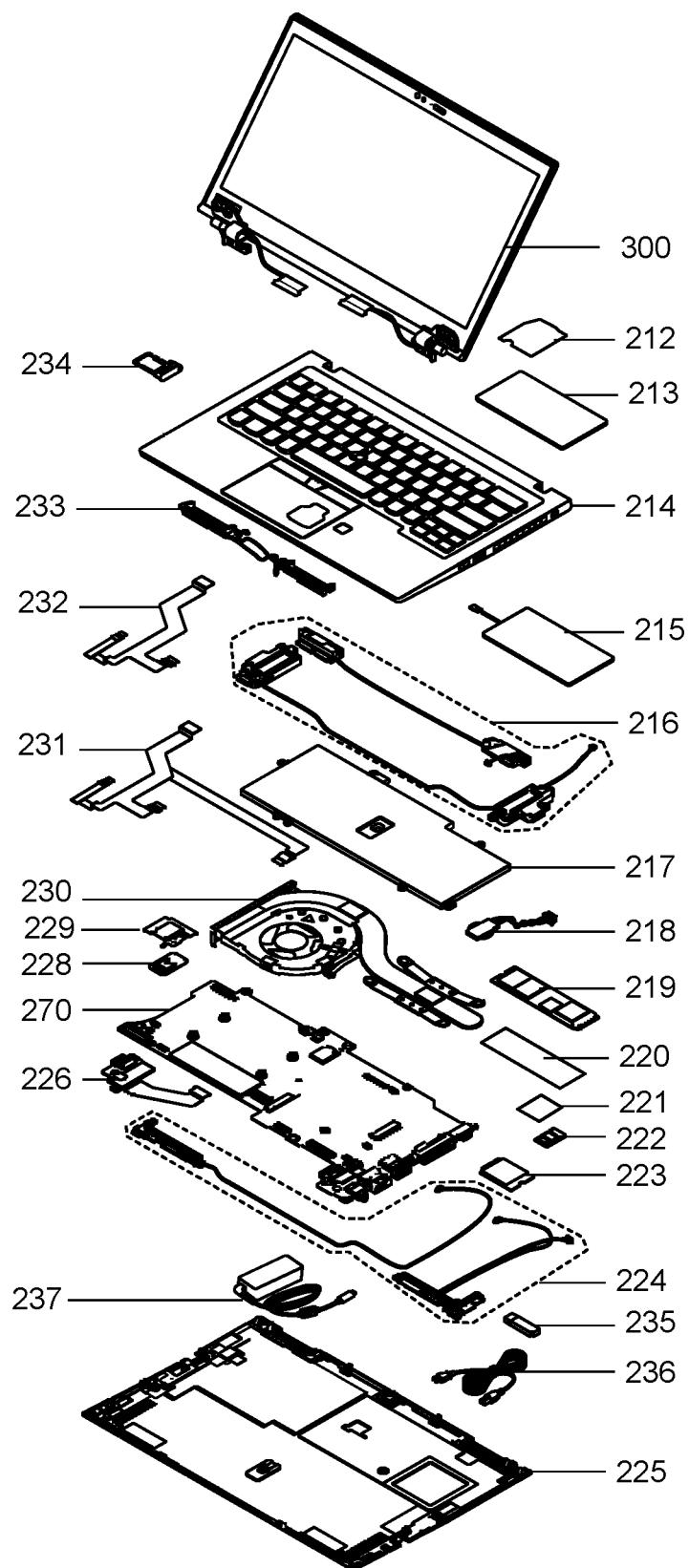
FIG. 2 is a diagram of an example of a system.

FIG. 2 shows an exploded perspective view of a computing system 200 as including various components, which can include, for example, a display assembly 300, insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

Figure 3:
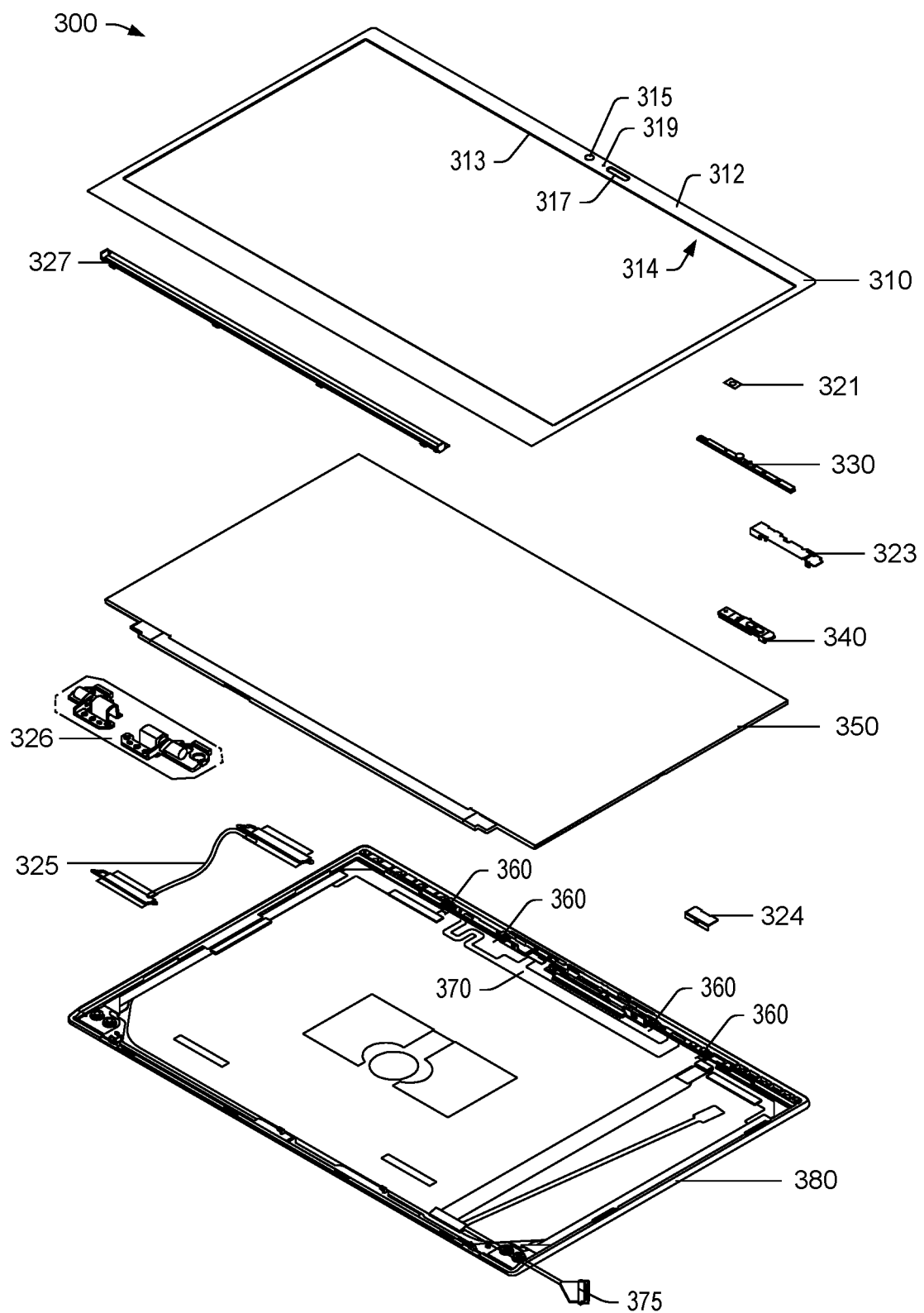
FIG. 3 is a diagram of an example of a display assembly of the system of FIG. 2.

FIG. 3 shows an exploded perspective view of the display assembly 300 of FIG. 2 as including various components, which can include, for example, a bezel 310, a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327.

In the example of FIG. 2 and FIG. 3, the computing system 100 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360. The display assembly 300 can be operatively coupled to other circuitry of the computing system 200, for example, via the one or more wiring connectors 375.

Figure 4:
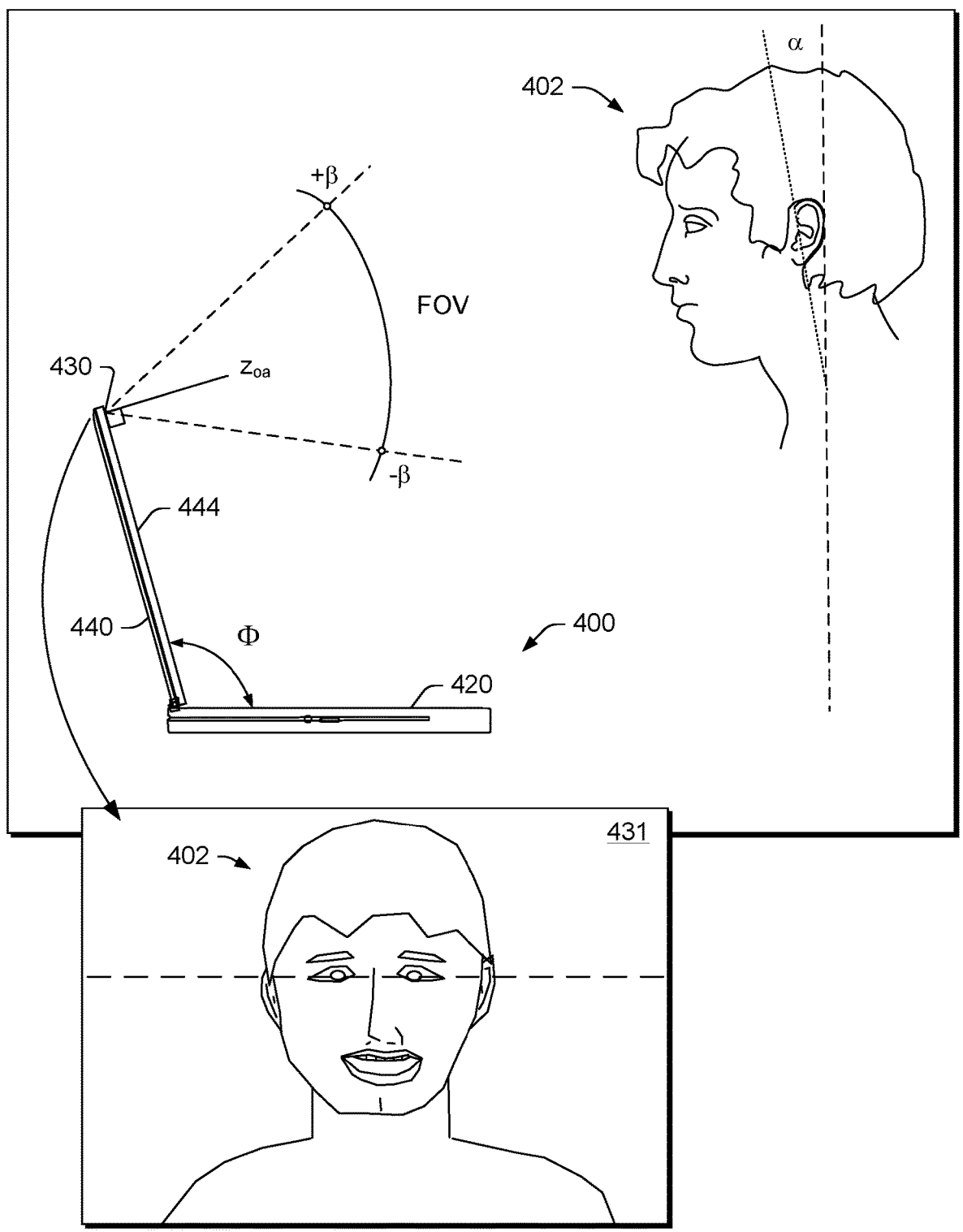
FIG. 4 is a diagram of an example of a system and a user.

FIG. 4 shows an example of a system 400 with respect to a user 402 where the system 400 includes a first housing 420, a second housing 440, and a camera 430, where the camera 430 of the system 400 can provide a field of view (FOV), as represented in an image 431 where the head of the user 402 is captured where the user's eyes are in the upper half of the image 431. In such an example, the user's head is not chopped off at the top or at the bottom and the user's neck is visible along with a portion of the user's shoulders.

In various instances, a user may desire that a captured image be somewhat similar to a portrait image as in portrait photography. In portrait photography, the eyeline is generally in the upper half of a portrait image. In portrait photography, it is generally recommended that a camera be level, or slightly above, the model's eyeline as a view from a low angle may be less flattering. In the example of FIG. 4, as the head of the user 402 is tilted slightly downward, the fact that the FOV of the camera 430 is along an axis pointing upwardly toward the user's eyeline can help to compensate for the camera being below the eyeline of the user 402. For example, with a slight tilt of the head, a captured image may be more pleasant than without the slight tilt (e.g., where a view may unpleasantly show the nostrils of the user). As shown, the slight tilt may be referenced with respect to vertical and defined by an angle α, which, in the example of FIG. 4, is approximately 10 degrees.

In the example of FIG. 4, the second housing 440 includes a display surface 444 that defines a plane where the camera 430 can have an optical axis $z_{oa}$ that is perpendicular to the plane (e.g., a display plane). In such an example, where an angle Φ between the housings 420 and 440 changes, the optical axis can change such that the FOV changes. As shown in FIG. 4, a FOV may be defined using one or more angles, for example, consider the angles +β and −β, which may be equal about the optical axis $z_{oa}$. As an example, a FOV may be characterized by a vertical angle or vertical angles and a horizontal angle or horizontal angles. As an example, a FOV may be characterized by a diagonal dimension, which can pass through an image center. In the example of FIG. 4, a vector aligned with the optical axis $z_{oa}$ can define a distance between an origin of an optical axis and a user, optionally a user's eye or eyes.

Figure 5:
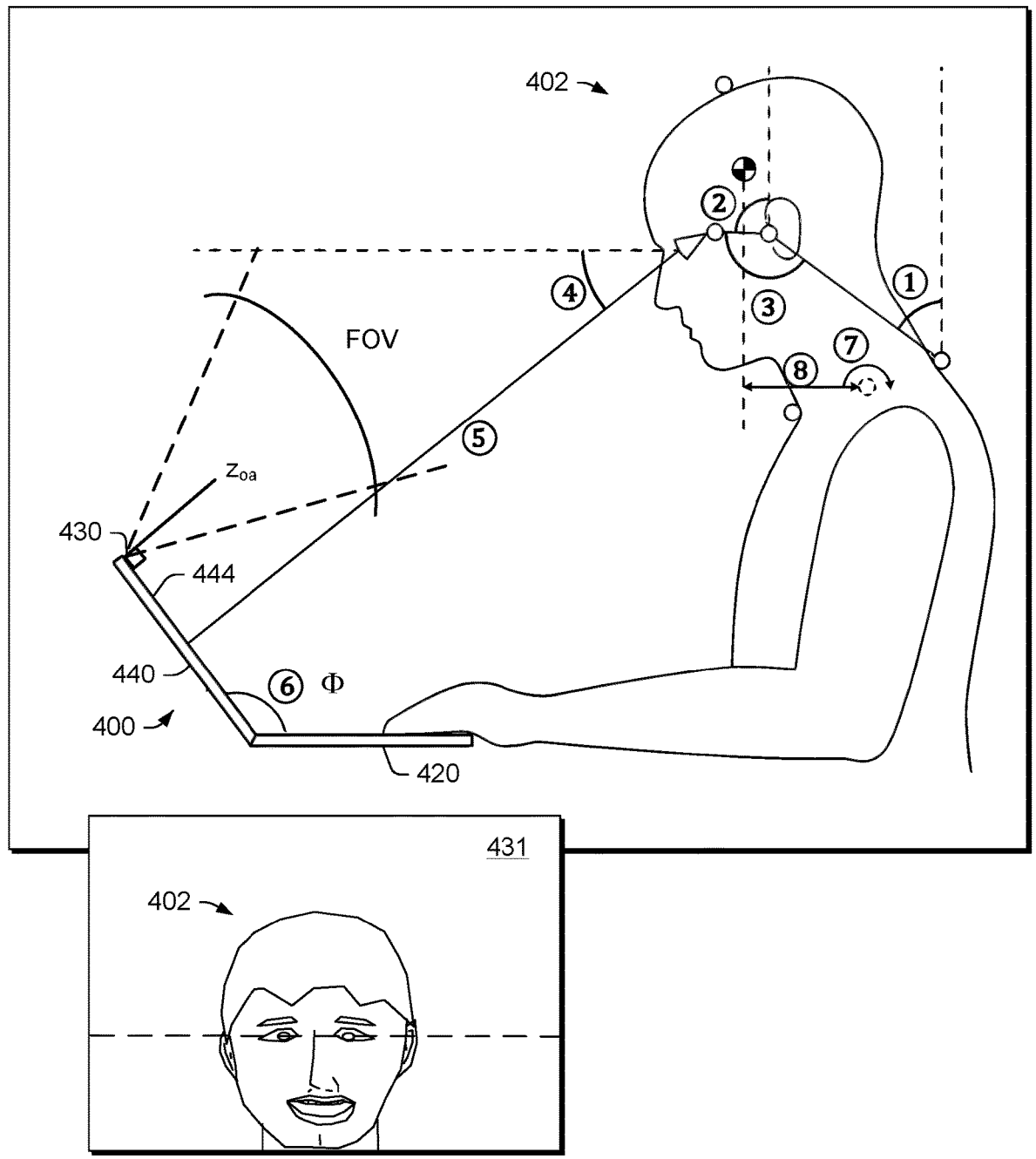
FIG. 5 is a diagram of an example of a system and a user along with example variables.

FIG. 5 shows an example of the user 402 and the system 400 in a different orientation, along with various references to angles, distances, etc., which may be considered to be variables, including a neck flexion angle (1), a head flexion angle (2), a cranio-cervical angle (3), a gaze angle (4), a gaze distance (5), a laptop tilt angle (6) or Φ, a gravitational moment on the neck (7), and a gravitational moment-arm of the neck (8). The variables are described in an article of Ailneni et al., Influence of the wearable posture correction sensor on head and neck posture: Sitting and standing workstations (Work, 62. 27-35, 10.3233/WOR-182839, 2019), which is incorporated herein by reference.

In the example of FIG. 5, the gaze distance (5) is shown as being along a normal vector to the plane defined by the display surface 444 and the optical axis of the camera 430 is shown as being normal to the plane defined by the display surface 444. The normal vector may be positioned at a center of the display surface 444 that is at a midpoint between left and right sides of the display surface 444 and at a midpoint between lower and upper sides of the display surface 444. As to the optical axis of the camera, it is at or proximate to the upper side of the display surface 444 and may be at or near a midpoint between the left and right sides of the display surface such that when the user is centered with respect to the display surface 444, the FOV captures an image that centers the user with respect to the display surface 444. As an example, where the housing 420 is a keyboard housing, the camera 430 may be positioned within a range defined by keys of a keyboard of the keyboard housing. For example, the camera 430 may be positioned between a Q key and a P key of a QWERTY keyboard, for example, a keyboard with a QWERTYUIOP row. As an example, the camera 430 may be positioned between an E key and a P key.

In the example of FIG. 5, the FOV of the camera 430 does not provide a captured image 431 of the user 402 where the eyeline is in the upper half of the FOV. As such, the eyeline is in the lower half of the FOV and the head of the user 402 is visible without the shoulders being visible. In such an example, if the user 402 moves downward, the head of the user 402, including the mouth of the user 402, may exit the FOV and, hence, the image 431.

Figure 6:
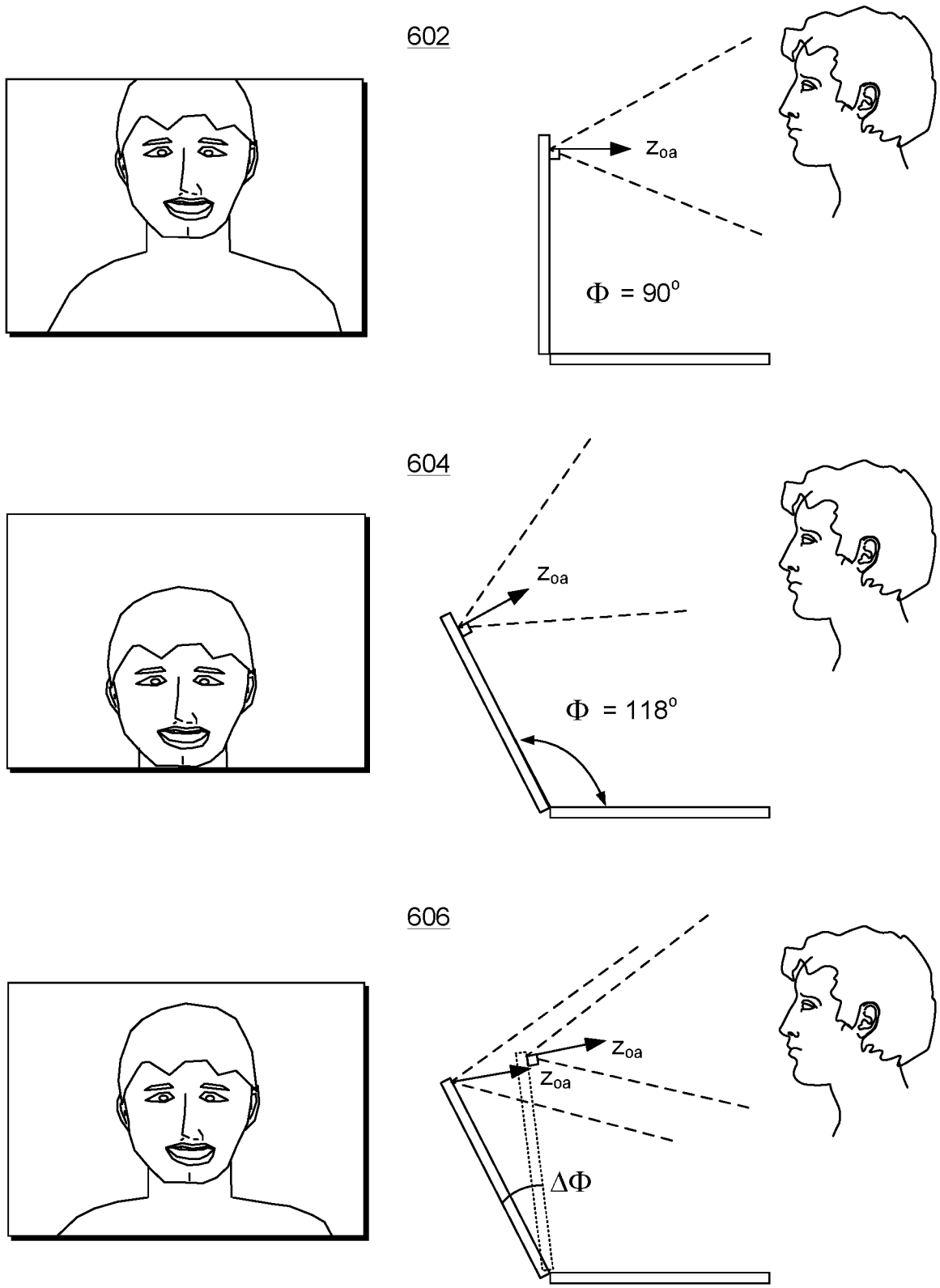
FIG. 6 is a series of diagrams of various example scenarios.

FIG. 6 shows example states 602, 604 and 606 for different angles Φ, including a state 602 of 90 degrees for a fixed optical axis camera, a state 604 of 118 degrees for a fixed optical axis camera and a transitional state 606 for an adjustable optical axis camera that can adjust responsive to a change in in angle (e.g., ΔΦ). As illustrated, the adjustable optical axis camera can help to maintain an acceptable FOV for captured images when a user transitions a system from one angle to another angle; whereas, for a fixed optical axis camera, various angles provide for unacceptable FOVs that result in unacceptable captured images, which may be deemed sub-optimal as the eyeline is in a lower half of the captured image (see, e.g., the state 604) and/or because a portion of a head of a user is chopped off (see, e.g., the state 602).

As an example, system can include a first housing that includes a display and an adjustable camera, where the display has a normal vector and where the adjustable camera has an optical axis; a second housing that includes a keyboard, a processor and memory accessible to the processor; and a hinge assembly that rotatably couples the first housing and the second housing, where rotation of the first housing with respect to the second housing actuates adjustment of the adjustable camera to adjust the optical axis with respect to the normal vector.

As an example, a system may be configured as or configurable to a tablet format. For example, consider a tablet computing system that includes a housing with a display and with a camera, which may be a single housing system or, for example, consider the system 100 of FIG. 1 and the orientation 107, which is a multi-housing system that includes a hinge assembly or hinge assemblies that provide for a tablet orientation. As an example, a system can include a camera where the optical axis of the camera is adjustable in a manner that depends on one or more inputs. As an example, an input can be a sensor input, a mechanical input, etc. For example, a sensor input may be from a sensor that can sense a position of a system, a portion of a system, a user, etc. and a mechanical input may be from a mechanical action such as moving a housing, which may include moving a housing with respect to another housing where the housings are coupled via one or more hinge assemblies.

Figure 7:
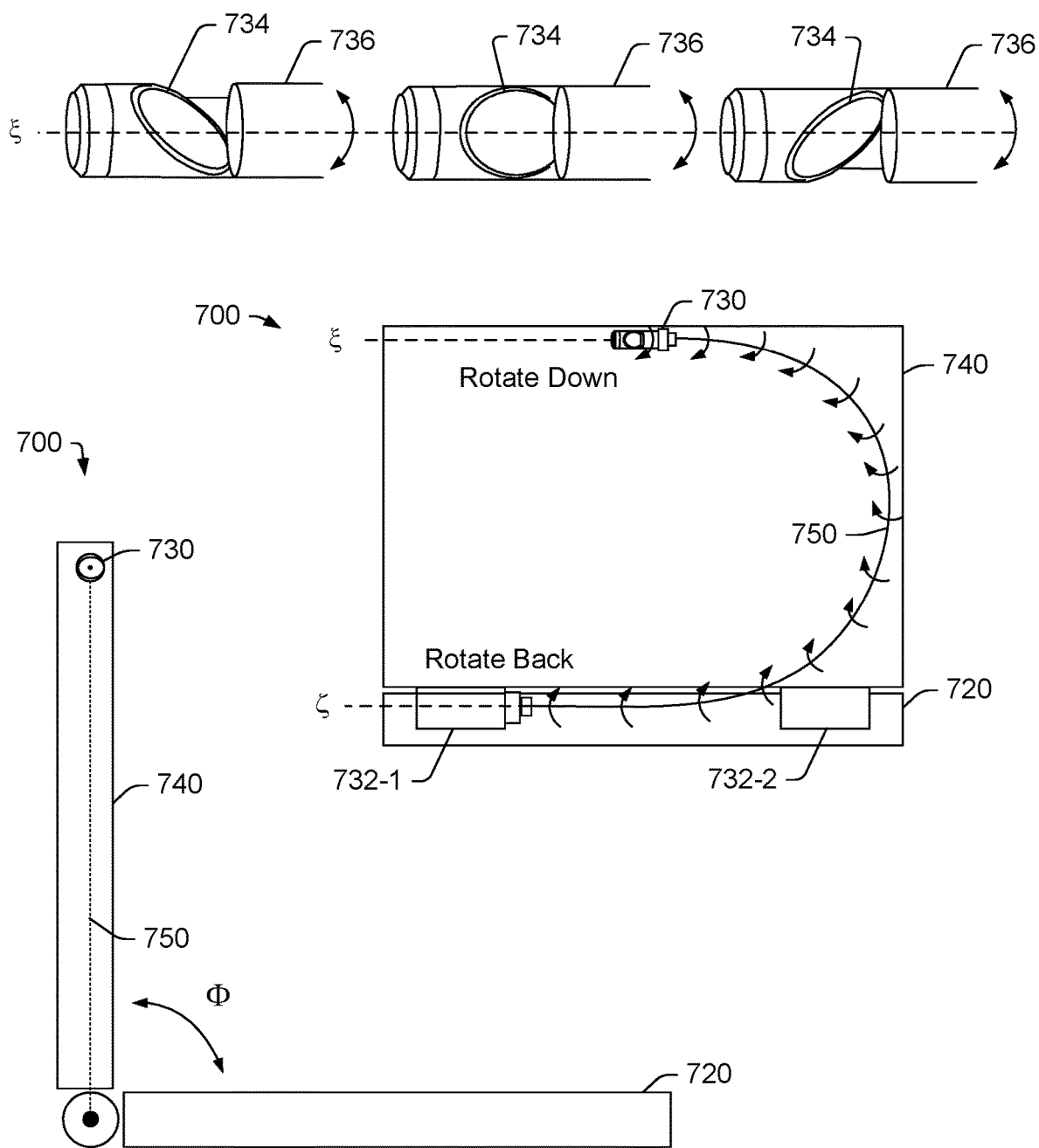
FIG. 7 is a series of diagrams of an example of a system.

FIG. 7 shows an example of a system 700 that includes a first housing 720, a second housing 740, a camera module 730, one or more hinge assemblies 732-1 and 732-2, and a cable 750 that operatively couples to the camera module 730 for adjustment of one or more components 734 and 736 thereof.

As to the cable 750, as an example, it may be a snake cable. For example, consider a plumber's snake or drain snake that is a slender, flexible auger that can be utilized to dislodge clogs in plumbing. A plumber's snake (e.g., a snake cable) can include a coiled (e.g., helix-shaped, etc.) wire, which may be disposed at least in part in a sleeve, where an operator can turn a crank to rotate the helix, which may be fitted with an end attachment that rotates responsive to rotation of the helix to facilitate disrupting a clog. As an example, the cable can be a snake cable such as an endoscope cable. For example, consider a video endoscope such as the PCE-VE 3xxN series (PCE Instruments UK Ltd, Southampton, UK), which includes a cable with a camera that can be fit with a mirror where the mirror can be an optical element that alters the optical axis of the camera. For example, the mirror can alter the optical axis from an on axis alignment with a longitudinal axis of the cable to a radial alignment that is perpendicular to the longitudinal axis of the cable. In such an example, the camera and the optical element may be defined using a cylindrical coordinate system where the cable may provide for rotation of at least the optical element to thereby adjust the optical axis.

In the example of FIG. 7, the component 734 can be an optical element such as a mirror (e.g., or reflective prism, etc.) and the component 736 can be a camera or another optical element that can direct light to a camera. While the camera module 730 includes components aligned along a longitudinal axis of the cable 750, it may be a camera module with one or more components aligned along a different axis (e.g., outwardly pointing axis, etc.). In the example of FIG. 7, rotation of the component 734 and/or the component 736 is aligned along an axis which can be parallel to the axis ζ. As shown, the axis of the cable 750 curves approximately 180 degrees; noting that a 90 degree curve may provide for rotation of the optical axis of a camera where, for example, one or more gears, etc., are provided that may translate such rotation another 90 degrees (e.g., consider a transmission, a geared coupling, etc.).

As shown in the example of FIG. 7, as the angle Φ is increased such that the housing 740 is rotated back away from the housing 720, the cable 750, or a component thereof, can rotate in the same rotational direction where, given the curve in the cable 750, that rotational direction is "flipped" such that an optical axis of the camera module 730 rotates in an opposite direction. For example, as the housing 740 is rotated back, the optical axis of the camera module 730 can be rotated down toward the housing 720. Such an example may be compared to the transitional state 606 of FIG. 6 where the optical axis angle changes depending on the angle Φ. For example, if the housing 740 is rotated forward, the optical axis can rotate up, and if the housing 740 is rotated back, the optical axis can rotate down. In both instances, the optical axis can be adjusted to better frame a user within a FOV to provide a more optimal captured image.

Figure 8:
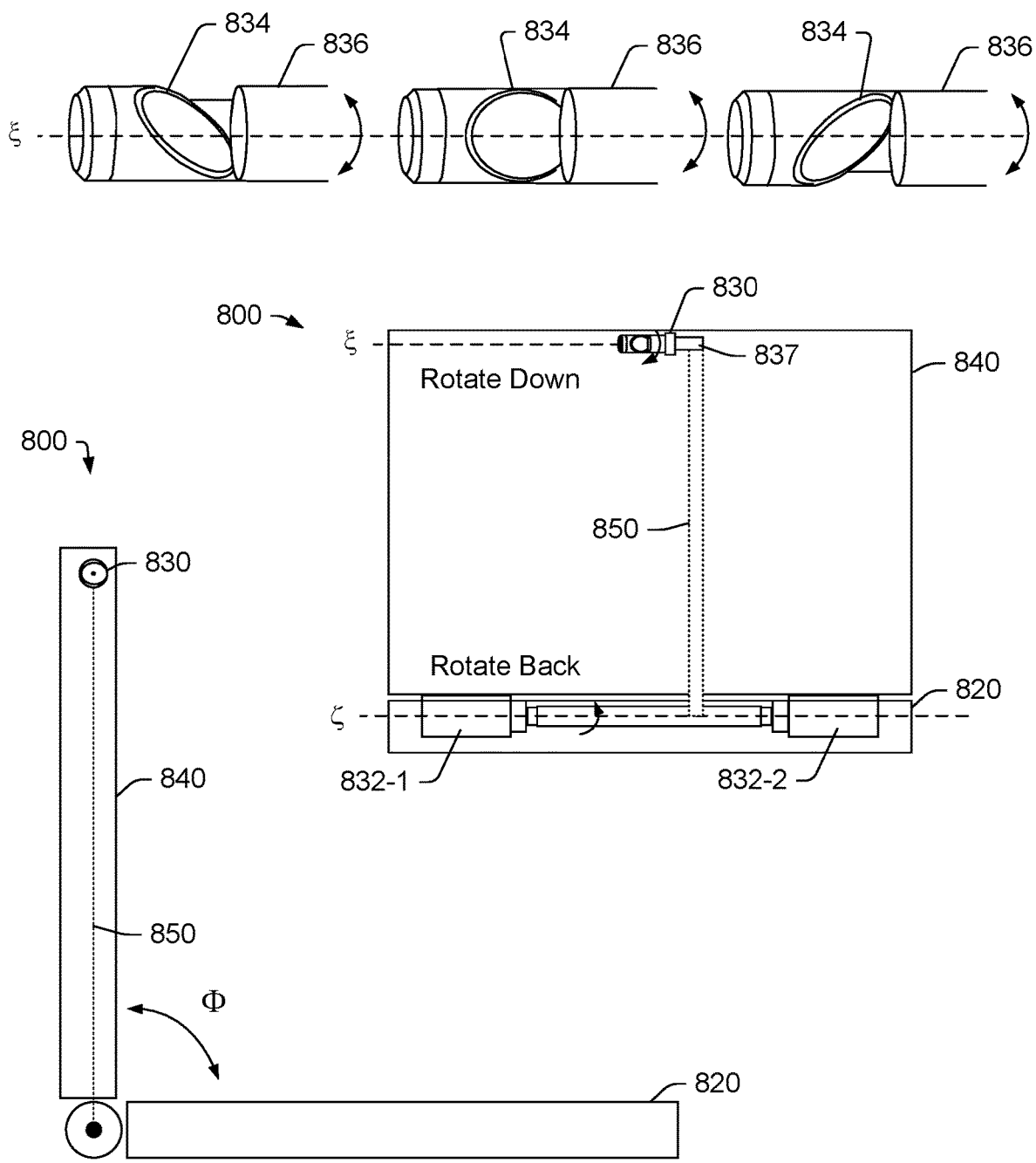
FIG. 8 is a series of diagrams of an example of a system.

FIG. 8 shows an example of a system 800 that includes a first housing 820, a second housing 840, a camera module 830, one or more hinge assemblies 832-1 and 832-2, and a connector 850 that operatively couples to the camera module 830 for adjustment of one or more components 834 and 836 thereof. In the example of FIG. 8, rotation of the component 834 and/or the component 836 is aligned along an axis which can be parallel to the axis ζ.

As to the connector 850, as an example, it may be a strap (e.g., a strap cable, etc.), with an appropriate properties (e.g., stiffness, etc.) to transfer mechanical action at one or more of the hinge assemblies 832-1 and 832-2 to the camera module 830.

In the example of FIG. 8, the component 834 can be an optical element such as a mirror (e.g., or reflective prism, etc.) and the component 836 can be a camera or another optical element that can direct light to a camera. While the camera module 830 includes components aligned along a longitudinal axis of the connector 850, it may be a camera module with one or more components aligned along a different axis (e.g., outwardly pointing axis, etc.).

As shown in the example of FIG. 8, as the angle Φ is increased such that the housing 840 is rotated back away from the housing 820, the connector 850, or a component thereof, can translate such that an optical axis of the camera module 830 rotates in an opposite direction. For example, as the housing 840 is rotated back, the optical axis of the camera module 830 can be rotated down toward the housing 820. Such an example may be compared to the transitional state 606 of FIG. 6 where the optical axis angle changes depending on the angle Φ. For example, if the housing 840 is rotated forward, the optical axis can rotate up, and if the housing 840 is rotated back, the optical axis can rotate down. In both instances, the optical axis can be adjusted to better frame a user within a FOV to provide a more optimal captured image.

In the example of FIG. 8, the connector 850 may translate upwardly when the housing 840 is rotated back by the connector 850 being operatively coupled to an axle or pin that rotates where such upward translation causes the camera module 830 to rotate downwardly by the connector 850 being operatively coupled to an axle or pin that can be forced to rotate in response to the upward translation. As an example, the camera module 830 can include or be operatively coupled to a spool 837, which may be spring-biased, for example, using a torsion spring. In such an example, the connector 850 may be wound onto or unwound from the spool 837 to cause rotation of an optical axis of the camera module 830. In such an example, the connector 850 may be a strand such as a flexible metal wire, a flexible polymeric thread, etc. In such an example, a spring may cause the strand to be in tension such that it does not become loose where, being loose, it may catch on one or more internal features of a system.

As an example, an adjustment mechanism can include one or more components, which may include a cable, a connector, a gear, gears, a cam, cams, a magnet, magnets, ferromagnetic material, etc., to provide for appropriate adjustment of an optical axis of a camera responsive to mechanical action (e.g., mechanical input). As an example, a magnet can be a permanent magnet or an electromagnet. As an example, an electromagnetic mover may include at least one electrical circuit that can generate at least one magnetic field (e.g., consider at least one electromagnetic field). As an example, an electromagnetic mover may include a solenoid. For example, consider an electromagnetic mechanical assembly that can cause rotation of an optical axis responsive to movement of a ferromagnetic plunger disposed at least in part in a coil. As an example, a first plunger may rotate an optical axis in a first direction and a second plunger may rotate an optical axis in a second direction. As an example, a plunger may be translatable in a first direction to rotate an optical axis clockwise and translatable in a second direction to rotate an optical axis counterclockwise. As an example, an electromagnetic mover such as a plunger or plungers may be operatively coupled to a ratchet, a gear, or another component that can convert translational movement to rotational movement. As an example, a ratchet assembly can include a ratchet wheel (or wheel portion) with teeth, a spring, an axle and a latch where an electromagnetic mover can cause the ratchet wheel to turn a number of degrees incrementally. In such an example, one mover may cause turning in one direction via incremental latching and another mover may cause turning in an opposite direction via incremental unlatching. As an example, an electromagnetic mover can be operatively coupled to a sensor, a detector or other circuitry that can issue a signal that can actuate the electromagnetic mover to adjust an optical axis of a camera (e.g., responsive to rotation of a display housing about an axis of a hinge assembly).

Figure 9:
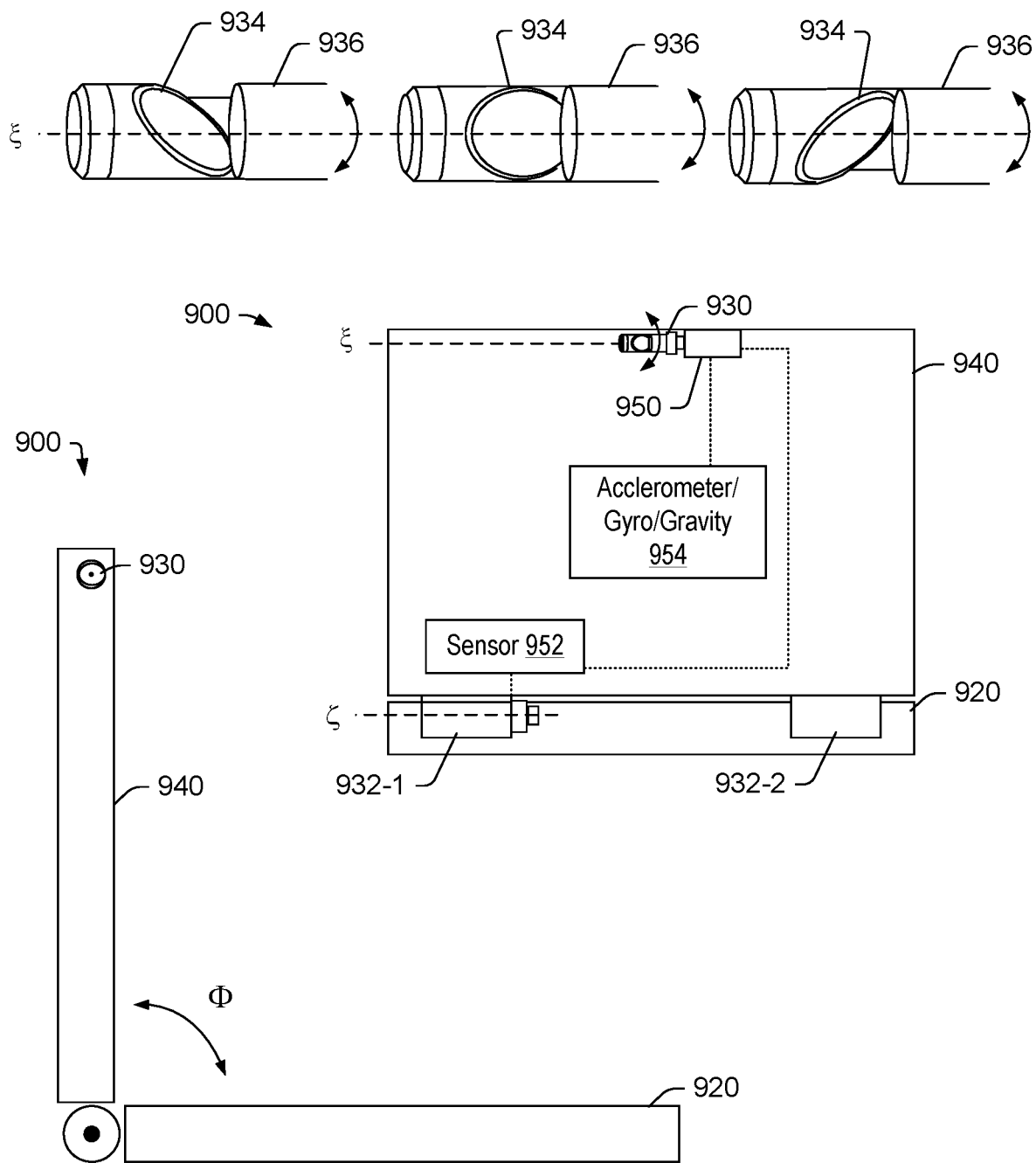
FIG. 9 is a series of diagrams of an example of a system.

FIG. 9 shows an example of a system 900 that includes a first housing 920, a second housing 940, a camera module 930, one or more hinge assemblies 932-1 and 932-2, and a motor 950 that operatively couples to the camera module 930 for adjustment of one or more components 934 and 936 thereof. In the example of FIG. 9, rotation of the component 934 and/or the component 936 is aligned along an axis which can be parallel to the axis ζ.

As to the motor 950, as an example, it may be a stepper motor that can step according to angular increments responsive to a signal or signals. For example, consider one or more signals generated via one or more of a sensor at one or more of the hinge assemblies 932-1 and 932-2, an accelerometer, a gyroscope or a gravity sensor 954, etc. As an example, the sensor 952 may detect a rotational position of a hinge component that can relate to an opening angle Φ of the housing 940 with respect to the housing 920 where a table, a function or other data structure may be utilized to determine an amount of rotation of an optical axis of the camera module 930. As to the accelerometer, a gyroscope or a gravity sensor 954, a position with respect to a direction of the acceleration of gravity may be detected. As an example, a sensor or sensors may be in the housing 920 and/or in the housing 940. As an example, a differential reading may be utilized, for example, where directions of the acceleration of gravity with respect to the housing 920 and with respect to the housing 940 may be utilized to determine an opening angle θ. As an example, a table, a function or other data structure may be utilized to determine an amount of rotation of an optical axis of the camera module 930 responsive to one or more sensor signals.

As an example, a stepper motor can be a relatively small stepper motor such as a stepper motor with a diameter less than approximate 15 mm, less than approximately 10 mm, etc. For example, consider a NetMotion (Livermore, Calif.) series AM 0820 stepper motor that has a diameter of approximately 7.9 mm and a motor length of approximately 13.8 mm. As an example, a stepper motor may be operatively coupled to a gearbox (e.g., a transmission, etc.) to provide for a suitable range of adjustments, which may be for a number of step angles. As an example, a gearbox may reduce a step angle, for example, consider reducing a step angle from 18 degrees for 20 steps about 360 degrees to a step angle of 1 degree, a step angle of 2 degrees, etc. As an example, a range may correspond to an expected range of use of a display housing (e.g., a range of angle Φ). For example, where an expected range of adjustment of an optical axis is +/−10 degrees from a normal outward vector of a display, a gearbox may reduce a step angle to 1 degree where 20 steps corresponds to a full rotation of 360 degrees of a motor shaft of a stepper motor (e.g., consider +/−180 degrees). As an example, a gearbox (e.g., a transmission, etc.) may provide a reduction ratio. For example, consider the NetMotion series 08/1 with reduction ratios of 4:1, 16:1, 64:1, 256:1, 1024:1 and 4096:1. Such a gearbox can have a diameter of approximately 10 mm or less, with a body length of approximately 10 mm to 20 mm.

In the example of FIG. 9, the component 934 can be an optical element such as a mirror (e.g., or reflective prism, etc.) and the component 936 can be a camera or another optical element that can direct light to a camera. While the camera module 930 includes components aligned along a longitudinal axis of the motor 950, it may be a camera module with one or more components aligned along a different axis (e.g., outwardly pointing axis, etc.). Further, as an example, the motor 950 may be disposed with its axis along a different direction where, for example, one or more of gears, couplings, etc., may be utilized to operatively couple the motor 950 to one or more components of the camera module 930.

As shown in the example of FIG. 9, as the angle Φ is increased such that the housing 940 is rotated back away from the housing 920, the motor 950, or a component thereof, can rotate such that an optical axis of the camera module 930 rotates in an opposite direction. For example, as the housing 940 is rotated back, the optical axis of the camera module 930 can be rotated down toward the housing 920. Such an example may be compared to the transitional state 606 of FIG. 6 where the optical axis angle changes depending on the angle Φ. For example, if the housing 940 is rotated forward, the optical axis can rotate up, and if the housing 940 is rotated back, the optical axis can rotate down. In both instances, the optical axis can be adjusted to better frame a user within a FOV to provide a more optimal captured image.

As an example, an adjustment mechanism that includes a motor can include one or more components, which may include a cable, a connector, a gear, gears, a cam, cams, a magnet, magnets, ferromagnetic material, etc., to provide for appropriate adjustment of an optical axis of a camera responsive to sensor input, which may be in response to mechanical input (e.g., mechanical action).

As an example, a system can include one or more shape memory alloy components. For example, consider a shape memory alloy that exhibits a cooling/heating cycle with thermal hysteresis. In such an example, the hysteresis width can depend on a nitinol composition and processing. As an example, consider a temperature range that spans approximately 20 degrees C. to 50 degrees C. (e.g., 36 degrees F. to 90 degrees F.), where it may be reduced or amplified by alloying and/or processing to a suitable range. As an example, a shape memory alloy may be temperature controlled to cause the shape of the shape memory alloy to change in a manner that adjusts an optical axis of a camera. For example, consider shape memory alloy that can be part of a rotary actuator. An article by Yuan et al., A review of rotary actuators based on shape memory alloys, Journal of Intelligent Material Systems and Structures, 2017, Vol. 28(14) 1863-1885, is incorporated by reference herein, which describes shape memory alloys and various types of mechanisms that can be actuated using one or more shape memory alloys. For example, a shape memory alloy wire that has a temperature dependent shape can cause rotation of a component responsive to a change in the shape.

As to a temperature change, as an example, a current may be passed through a shape memory alloy that causes the shape memory alloy to increase in temperature and change shape. As an example, a shape memory alloy may be proximate or adjacent to a wire, a component, etc., that can be heated using electrical energy such that the temperature and shape of the shape memory alloy can be controlled. As an example, a shape memory alloy may be part of a bi-directional actuator, for example, using a bias spring (e.g., a return spring, etc.), multiple shape memory alloy components, etc. In such an example, a first direction may be a clockwise direction of rotation for an optical axis of a camera and a second direction may be a counterclockwise direction of rotation for the optical axis of the camera.

Figure 10:
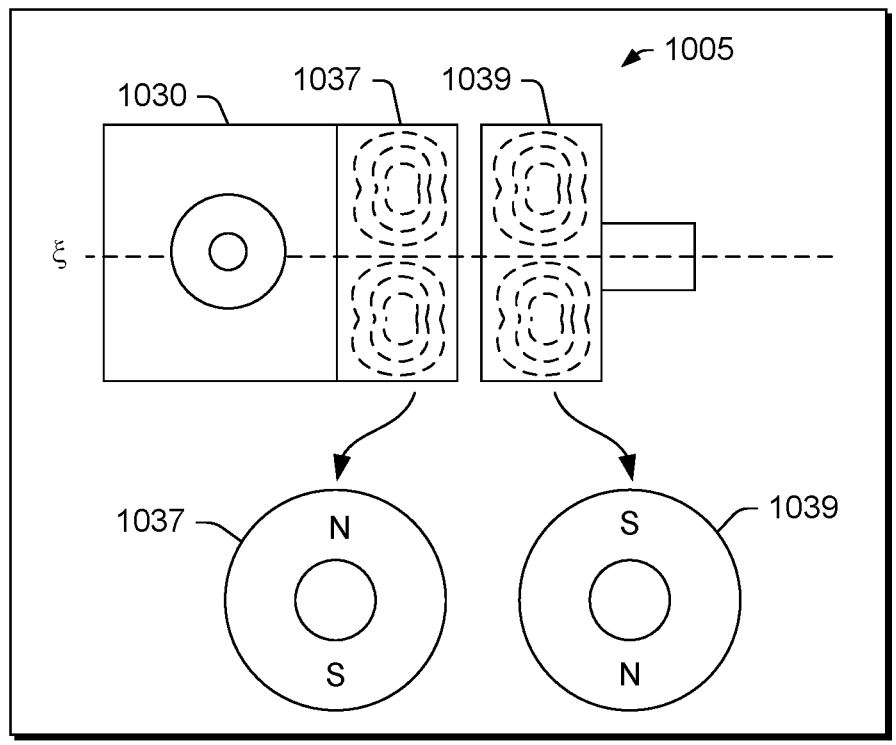
FIG. 10 is a series of diagrams of examples of portions of systems.
Figure 10:
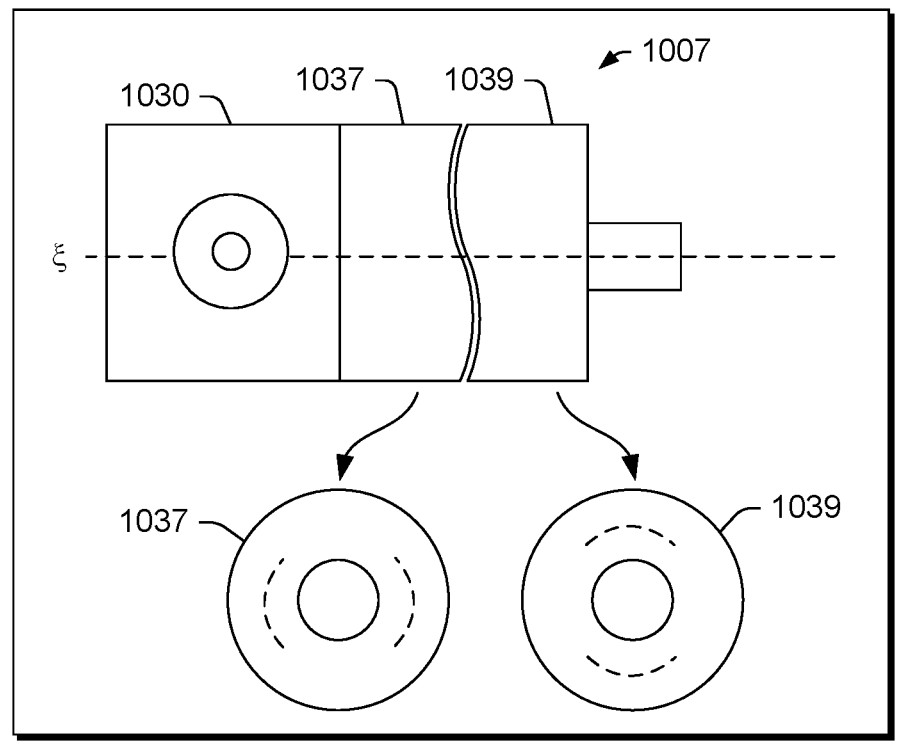

FIG. 10 shows examples 1005 and 1007 of couplings for adjusting an optical axis of a camera 1030. As shown, the camera 1030 can include a component 1037 and an adjuster can include a component 1039 where the components 1037 and 1039 couple for adjusting the optical axis of the camera 1030. In the example 1005, the couplings can include one or more magnets (e.g., one or more permanent magnets and/or one or more electromagnets) where magnetic field alignment or misalignment may provide for a controlled manner of adjusting the optical axis of the camera. In such an example, one or more of the components 1037 and 1039 can be limited in range of rotation and/or in axial movement. For example, an attraction force may cause engagement while a repulsion force may cause disengagement. As to the example 1007, one or more of the components 1037 and 1039 can include a cam or cam surface such that the optical axis of the camera 1030 can be controlled in a desirable manner. As an example, in either or both of the examples 1005 and 1007, the range of rotation of the camera 1030 may be limited to a particular range, which may correspond to a range or ranges of usage of a system. For example, where a laptop is positioned horizontally on a surface such as a desktop, a user may adjust a display housing to an angle Φ of approximately 135 degrees (e.g., +/−5 degrees) for adequate viewing and where the laptop is positioned on a user's lap, which may be substantially horizontal or slightly tilted, the user may adjust the display housing to an angle Φ of approximately 150 degrees (e.g., +/−5 degrees). In such examples, an optical axis may be angled more downwardly for the larger angle Φ.

Figure 11:
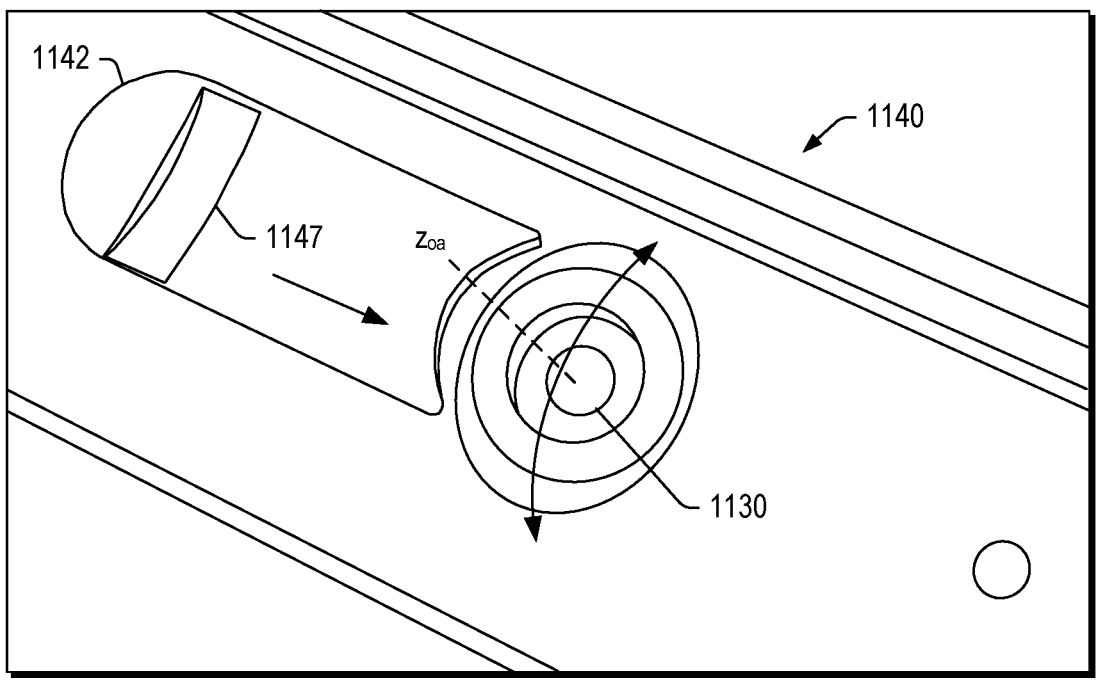
FIG. 11 is a series of diagrams of an example of a system.
Figure 11:
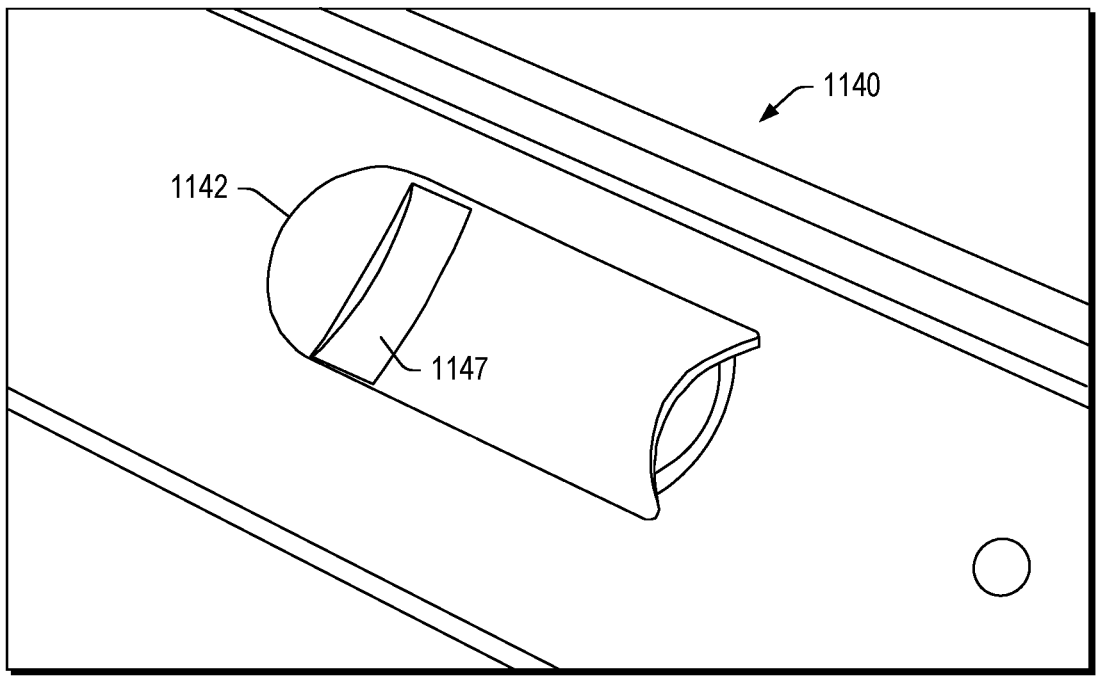

FIG. 11 shows an example of a display housing 1140 that includes a shutter 1142 that can include a grip feature 1147 where the shutter 1142 may be positioned to cover the optical axis of the camera 1130. In such an example, an adjustment mechanism may be disabled. For example, consider a mechanical disablement that may physically decouple components or, for example, consider an electrical disablement that may electrically decouple components.

Figure 12:
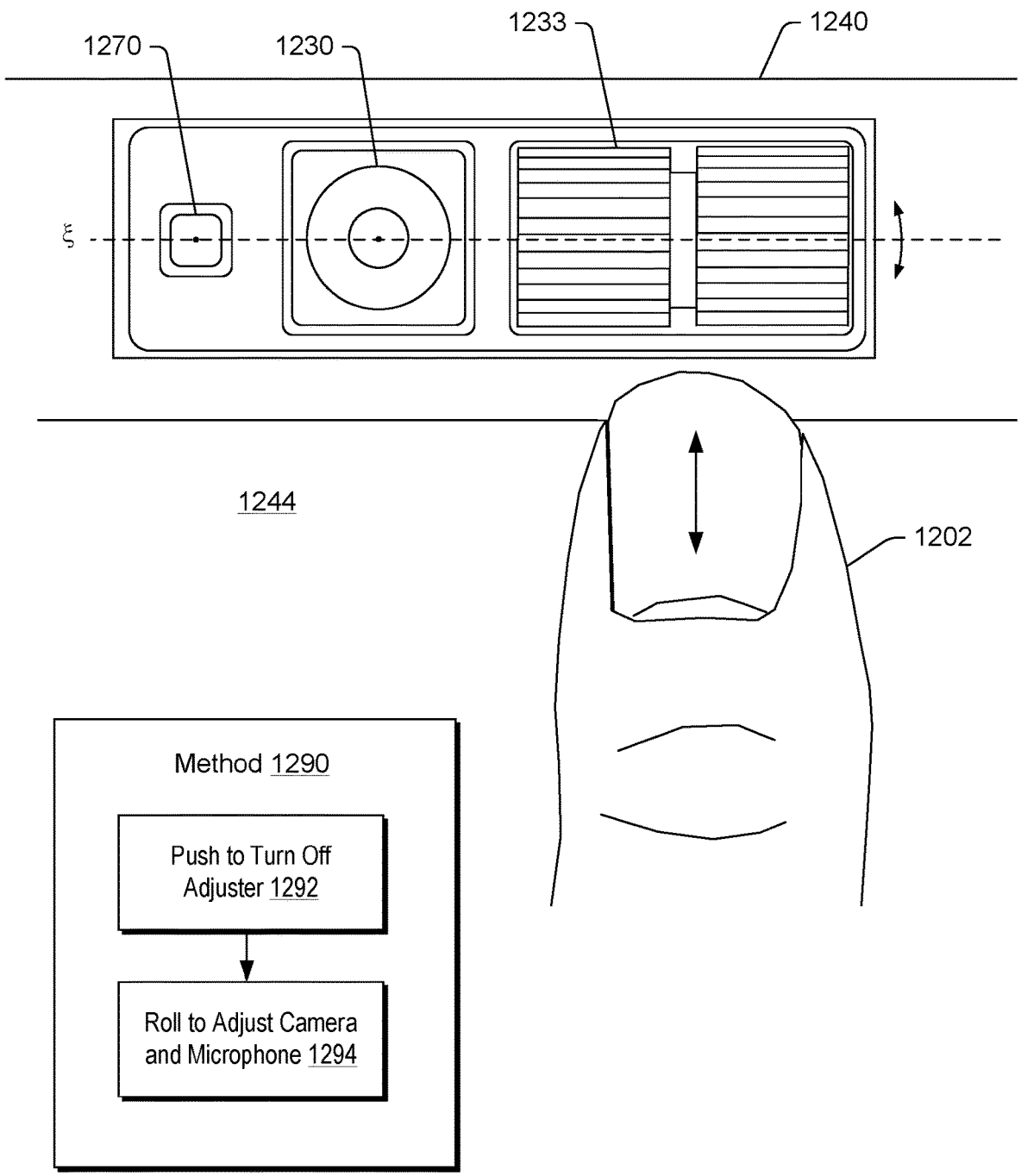
FIG. 12 is a series of diagrams of an example of a system and an example of a method.

FIG. 12 shows an example of a display housing 1240 that includes a display surface 1244, a camera 1230, a wheel 1233, a microphone 1270, a finger 1202 of a user, and an example method 1290. In such an example, the wheel 1233 may be a push wheel that can turn on and turn off an adjustment mechanism and/or otherwise override an adjustment mechanism. For example, the method 1290 includes a push block 1292 to turn off an adjuster and a roll block 1294 for rolling the wheel 1233 to adjust an optical axis of the camera 1230. In the example of FIG. 12, the camera 1230 may include the microphone 1270. For example, consider an audio-visual module that can rotate as a unit such that rotation of an optical axis of a camera causes rotation of an audio axis of a microphone. In such an example, adjustment of the microphone may improve reception of voice of a speaker where an image of the speaker can be captured using the camera. As an example, an audio axis can be parallel to an optical axis where both axes may be adjustable upwardly and downwardly responsive to actuation of a wheel, a motor, a strand (e.g., a cable, a band, etc.), etc.

In the example of FIG. 12, where a user desires a customized angle of the optical axis of the camera, the user can override an angle provided by an adjustment mechanism. As another example, consider a display housing gesture based disablement mechanism where a user may move a display housing a few degrees back and forth within a period of time such that one or more sensors detect the movements and determine that the user desires disablement of the adjustment mechanism. For example, the user may wish to show something in front of the camera, which may be an immovable object such that the user cannot pick up the object to position it in front of the camera (e.g., consider showing a room scene, a street scene, a view of another person in a room, etc.). As an example, an adjustment mechanism may be voice controllable via one or more voice commands received via a microphone of a system. In such an example, an optical axis may be adjusted and/or an adjustment mechanism enabled and/or disabled.

While the example of FIG. 12 shows an up and down approach to adjusting the optical axis of the camera 1230, as an example, a wheel or other component may be included for side to side adjusting of an optical axis of the camera 1230. For example, consider a wheel that has an up and down axis such that the wheel rolls side to side by touching the wheel with a fingertip or other object (e.g., a pencil eraser end, a stylus, etc.).

As an example, the wheel 1233 may be utilized as an offset wheel. For example, consider a default optical axis angle that is set by a manufacturer where a user can set the optical axis to a different angle using the wheel 1233. In such an example, one or more adjustments may be made from the set angle. Such an approach may be suitable to accommodate users of different heights, users of different support surfaces, users of stands, users of laps, etc. As an example, a user may set the optical axis angle for a system where the system is on a desktop at a particular opening angle Φ such that the system can automatically adjust the optical axis angle when the opening angle Φ is changed. As an example, a system may include circuitry that can set an optical axis angle. For example, consider use of a keyboard with plus and minus keys that can be pressed while a user is looking into a camera such that the user can appropriately adjust an optical axis angle for an appropriate portrait image of the user's face. In such an approach, the user may enter a command (e.g., keystroke, etc.) or the system may automatically store the optical axis angle to be a reference from which rotations can be made.

As explained, various systems are equipped with a fixed camera that has an optical axis that points outwardly at 90 degrees, which may define a normal or normal vector. As opening angles of clamshell systems can vary depending on position, user preference, application or type of application executing, etc., a fixed optical axis can be suboptimal. For example, a user may launch a videoconferencing application with a clamshell system on a desktop or on the user's lap where the opening angle may differ and hence the optical axis intersection with the user's head (e.g., user's face) may differ. In one or both of such orientations, the user's head may not be optimally positioned within the FOV of the camera, which can be distracting during a videoconference, particularly where a portion of the user's head is cutoff (e.g., outside the FOV), etc.

As explained, the optical axis of a laptop camera can cause a face of a user to be vertically off-center for various reasons, such as, for example, the user tilts the laptop or display housing too far towards herself (or away) or where the base (e.g. keyboard housing) of the laptop is angled due to sitting on the user's lap or being carried. Height of a user may also impacts centering, noting that a camera may be designed to accommodate three standard deviations of human height at normal table heights. As mentioned, a system can include one or more mechanisms for adjusting to a reference optical axis angle and/or otherwise customizing an optical axis angle.

In various instances, an adjustment to an optical axis may provide for glare, unacceptable lighting, etc. For example, consider an automated approach where a captured image can be analyzed for purposes of glare on a user's face, a user's glasses, etc., and/or unacceptable lighting, which may cause rays of light to enter the camera's aperture. In such instances, an automated approach may automatically attempt to adjust an optical axis angle such that quality of a captured image is improved. As mentioned, the approach as in FIG. 12 may provide for override, which may be an override to address glare, unacceptable lighting, etc.

As explained, a system can include components that provide for adjusting an optical axis of a camera, by adjusting the camera and/or one or more optical elements, in an up or down direction. In such an example, an adjustment can be made on the basis of an opening angle and/or one or more other angles (e.g. angle with respect to gravity, etc.). In various example, a system can adjust an optical axis of camera down as an opening angle increases, which may be within a range of opening angles, and the system can adjust the optical axis of the camera up as the opening angle decreases, which may be within a range of opening angles (e.g. a common range or a different range). As explained, one or more housings of a system can include one or more sensors that can measure an angle such as an angle with respect to the direction of the acceleration of gravity. In such an example, a method can include determining a base angle of the system relative to horizon (e.g., measured using a gyroscope, an accelerometer, a gravity sensor, etc.) and adjusting an optical axis up as a rear of base is raised with respect to a front of the base (e.g., and vice versa).

As explained, a system can include one or more cams on a hinge assembly that engage when an opening angle is between approximately 90 degrees and approximately 160 degrees. In such an example, the cam or cams can press against a slider or sliders that are operatively coupled up to a camera. In such an example, the slider or sliders can attach to a camera module in such a way to adjust the camera vertical direction from its default position, which may be approximately 90 degrees. As explained, a cam can be shaped so as to counter rotation of a display housing in the range where the cam is engaged, and to do nothing when outside the range. The range could be modified and preconfigured based on expected system usage.

As an example, a system may include circuitry that can adjust an optical axis of a camera, where such circuitry can be wired and/or wireless. As explained, one or more sensors may be utilized for sensor input, which can be utilized to determine an opening angle and/or a desirable optical axis angle of a camera. Such an approach may utilize an electric motor, which may be a stepper motor that can be incrementally controlled to make steps according to angular increments.

Figure 13:
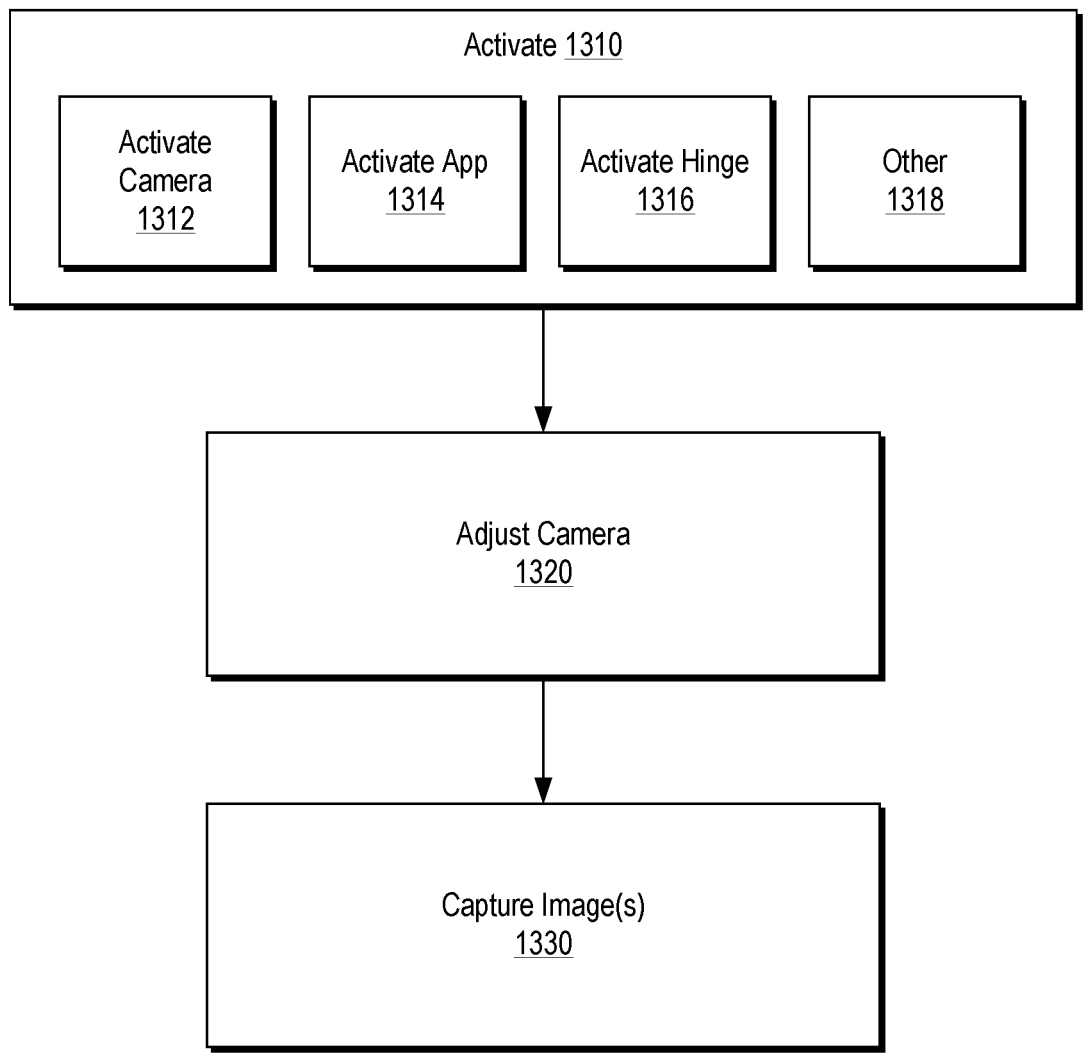
FIG. 13 is a diagram of an example of a method.

FIG. 13 shows an example of a method 1300 that includes an activate block 1310 for activating an adjustment to an optical axis of a camera, an adjustment block 1320 for adjusting an optical axis of a camera and a capture block 1330 for capturing one or more images using the camera where a field of view (FOV) of the camera is defined along the optical axis.

In the example of FIG. 13, the activation block 1310 can include a activate camera block 1312, an activate application block 1314, an activate hinge block 1316 and/or one or more other activate blocks 1318. As an example, activation may occur responsive to activation of one or more of a camera, an application, a hinge, etc. For example, consider a system that receives an instruction to activate a camera, where such an instruction may cause an adjustment mechanism to become active and, if appropriate, adjust an optical axis of the camera. In such an example, the instruction may be responsive to activation of an application, which may include instantiation of an instance of the application, bringing the application forward in a stack of applications, interacting with the application, etc. As to a hinge activation approach, upon detection of a rotational orientation of a housing with respect to another housing, an adjustment mechanism may be activated and, if appropriate, adjust an optical axis of a camera.

In the example of FIG. 13, the method 1300 may include making one or more application programming interface (API) calls. For example, upon launching of the videoconferencing application, an API call may be made that wakes up (e.g., activates) an adjustment mechanism, which can include circuitry that can be activated for purposes of making automated adjustments to an optical axis of a camera for capturing images for transmission in a videoconferencing session.

Figure 14:
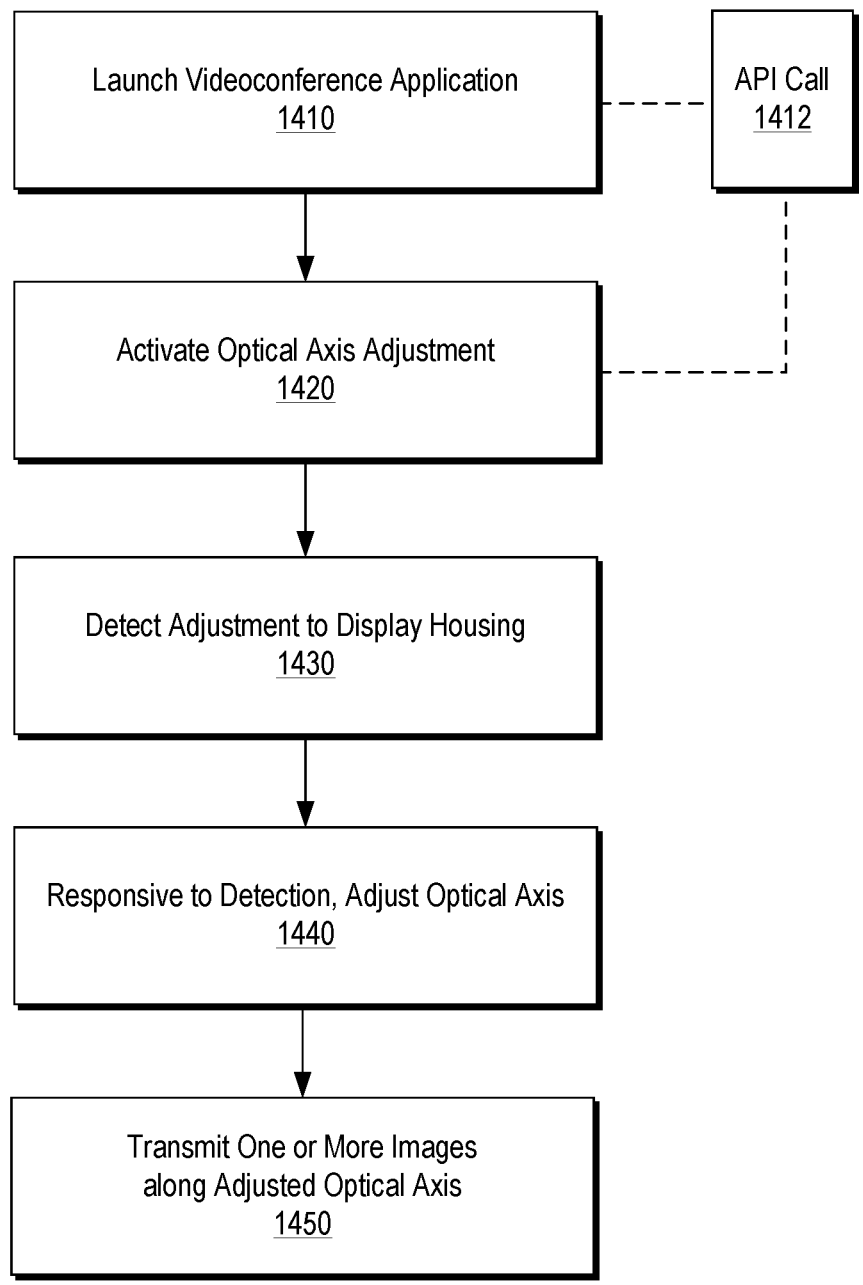
FIG. 14 is a diagram of an example of a method.

FIG. 14 shows an example of a method 1400 that includes a launch block 1410 for launching a videoconferencing application, an activation block 1420 for activating an optical axis adjustment mechanism, a detection block 1430 for detecting an adjustment to a display housing, an adjustment block 1440 for, responsive to the detecting, adjusting an optical axis of a camera (e.g., to get a person's head in a FOV of the camera, optionally optimally within the FOV), and a transmission block 1450 for transmitting one or more images captured along the adjusted optical axis of the camera. As shown in the example of FIG. 14, an API block 1412 may be included for purposes of making an API call or API calls and, for example, responsive to such a call or calls, receiving a response or responses (e.g., a confirmation that activation has been achieved and a mechanism is ready for use).

As an example, a system can include a first housing that includes a display and an adjustable camera, where the display includes a normal vector and where the adjustable camera includes an optical axis; a second housing that includes a keyboard, a processor and memory accessible to the processor; and a hinge assembly that rotatably couples the first housing and the second housing, where rotation of the first housing with respect to the second housing actuates adjustment of the adjustable camera to adjust the optical axis with respect to the normal vector. In such an example, for a first rotational angle between the first housing and the second housing, the optical axis may be parallel to the normal vector and, for a second rotational angle between the first housing and the second housing, the optical axis may not be parallel to the normal vector.

As an example, rotation of a first housing with respect to a second housing in a clockwise direction can actuate a rotational adjustment of an adjustable camera in a counter-clockwise direction.

As an example, rotation of a first housing with respect to a second housing in a counterclockwise direction can actuate rotational adjustment of an adjustable camera in a clockwise direction.

As an example, an adjustable camera can include a mechanical coupling to a hinge assembly. For example, consider a mechanical coupling that includes a strand, where at least a portion of the strand moves responsive to rotation of the first housing with respect to the second housing. In such an example, the strand can be a flexible rotatable fiber or, for example, a slidable band. For example, consider the examples of FIG. 7 and FIG. 8, which show examples of strands. As an example, a portion of a strand may be windable such that it may wind onto or off of a spool, which may cause rotation of one or more components about an axis of the spool. For example, consider adjusting an optical axis by rotation of a spool about a spool axis. In such an example, the spool may be a cylindrical component with a longitudinal axis that can rotate and cause rotation of an optical axis. For example, the component 836 in the example of FIG. 8 may be part of the spool 837 or may be operatively coupled to the spool 837. As an example, a spool may be spring-biased, which may be biased by a torsion spring. In such an example, a strand, which may be a slidable band, may be taken up or let out from the spring-biased spool responsive to rotation of a display housing about an axis of a hinge assembly. For example, the strand may be coupled to an axle of the hinge assembly and to the spring-biased spool such that winding of the strand about the axle causes the spool to let out the strand and, in so doing, the spool rotates; whereas, for example, unwinding of the strand from the axle can cause the spring-biased spool to take up the strand such that the spool rotates. As an example, a spring-biased spool may maintain a strand in a tension state where the strand may also be coupled to a hinge assembly (e.g., fixed to a rotating axle, etc.).

As an example, a mechanical coupling can include a cam. For example, consider a cam that includes an engagement surface that rotates and/or an engagement surface that translates. For example, consider the example coupling 1007 of FIG. 10 where a cam surface may be an annular surface with a ridge and/or a valley where rotation of the annular surface engages another surface, which may include a ridge and/or a valley. As to a translatable surface, consider a coupling with a cam component that can translate responsive to rotation of another cam component. In such an example, the rotatable cam component may be lobed where the translatable component can ride on the rotatable cam component and translate responsive to the lobed shape. In such an example, the translatable cam component may be coupled to a component of a camera that can cause an optical axis of the camera to rotate clockwise or counterclockwise. For example, consider a cylinder with an extension that extends radially outward from the cylinder and couples to a translatable cam component where translation causes the cylinder to rotate about its longitudinal axis, which can control direction of an optical axis.

As an example, a mechanical coupling can include at least one permanent magnet. For example, consider a component that can cause movement of a permanent magnet where such movement causes adjustment of an optical axis of a camera.

As an example, an adjustable camera can be operatively coupled to an electromagnetic mover. In such an example, a system can include a position sensor that is operatively coupled to the electromagnetic mover, where the position sensor senses a position of a first housing with respect to a second housing (e.g., consider the angle Φ). As an example, where an angle changes between a first housing and a second housing, a position sensor can issue a signal that causes an electromagnetic mover to adjust an optical axis of a camera. As an example, an electromagnetic mover can be an electric motor, which may be, for example, a stepper motor.

As an example, a system can include control circuitry operatively coupled to an electromagnetic mover. In such an example, the control circuitry can operate responsive to instantiation of a video conferencing application via a processor of the system. For example, consider a video conferencing application that can make one or more application programming interface calls (API calls) to activate one or more features of a system such as one or more features that can adjust an optical axis of a camera suitable for use in capturing video images (e.g., video images of a user of the video conferencing application).

As an example, a system can include an adjustable microphone, where rotation of a first housing with respect to a second housing can actuate adjustment of the adjustable microphone. For example, an adjustable microphone can include an audio axis that may be adjustable upwardly and downwardly in a manner that may be referenced with respect to a normal vector of a display (e.g., a normal outward vector of a display surface of the display). For example, where the normal vector of the display is altered, the audio axis of the adjustable microphone may be adjusted.

As explained, a system can include an adjustable camera and an adjustable microphone where a change in an angle between a first housing and a second housing about a hinge assembly can cause an adjustment to an optical axis of the adjustable camera and an adjustment to an audio axis of the adjustable microphone.

As an example, a method can include adjusting an optical axis of an adjustable camera of a display housing of a clamshell computing system responsive to rotation of the display housing with respect to a keyboard housing of the clamshell computing system, where a hinge assembly rotatably couples the display housing and the keyboard housing. In such an example, the optical axis may be adjusted with reference to a normal outward vector of a display surface of the display housing. In such an example, the optical axis may move in an opposite angular direction. For example, where the normal outward vector rotates clockwise, the optical axis can rotate counterclockwise; and, where the normal outward vector rotates counterclockwise, the optical axis can rotate clockwise. Such an approach can aim to maintain a user's head within a field of view of the adjustable camera where, for example, the user is using a video conferencing application to stream video of at least the user's head. As an example, a method can include sensing rotation of a display housing via a sensor where, for example, a system can include actuating an adjuster responsive to a sensor signal and/or where a system can include rendering a graphic to a display, which may indicate an angular adjustment to an optical axis of an adjustable camera (e.g., "rotate camera X degrees upwardly" or "rotate camera Y degrees downwardly").

As an example, a system can include a housing that includes a display and an adjustable camera, where the display includes a normal vector and where the adjustable camera includes an optical axis; and a sensor that detects a change in orientation of the housing that actuates adjustment of the adjustable camera to adjust the optical axis with respect to the normal vector.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 15:
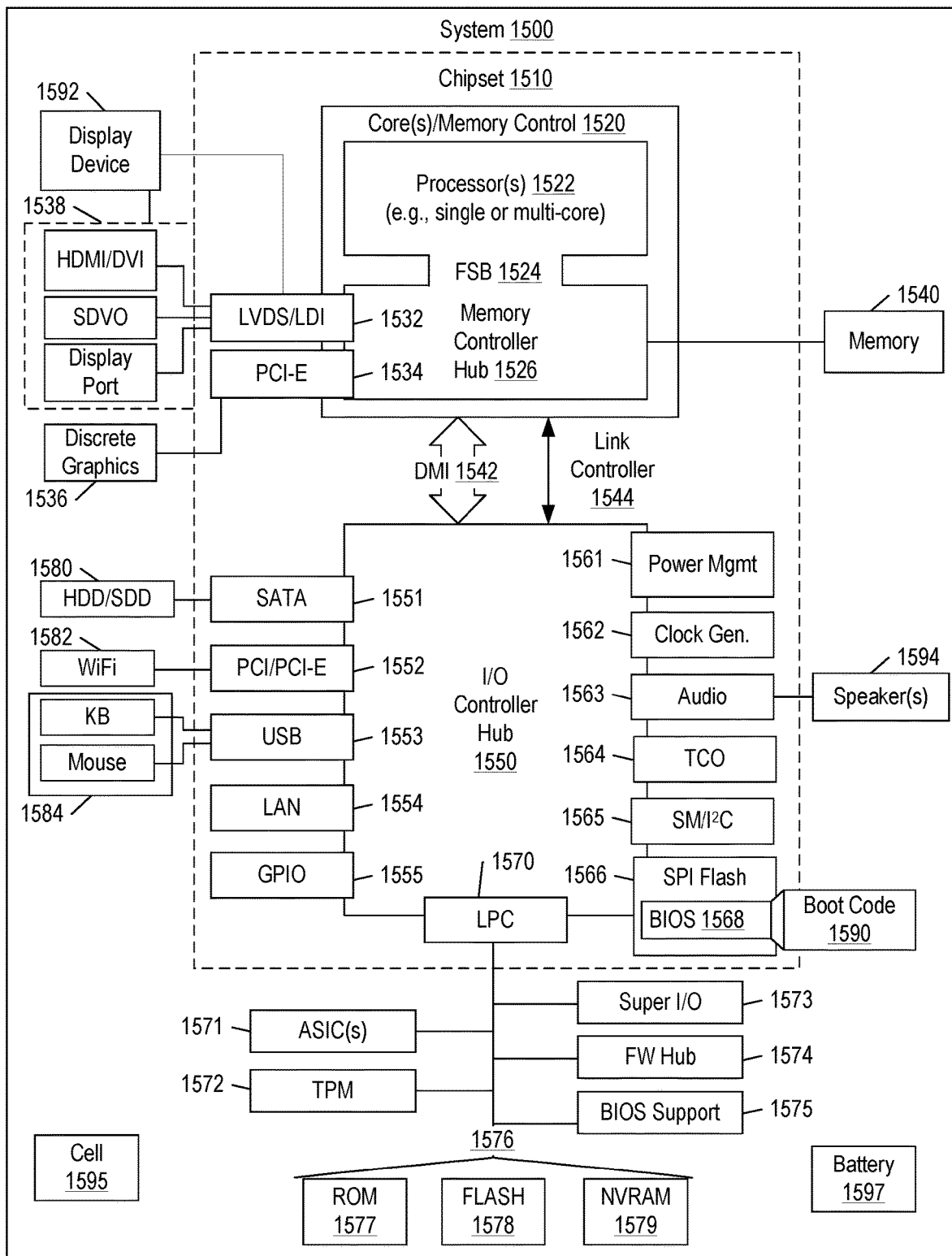
FIG. 15 is a diagram of an example of a system that includes one or more processors.

While various examples of circuits or circuitry have been discussed, FIG. 15 depicts a block diagram of an illustrative computer system 1500. The system 1500 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1500. As an example, a system such as the system 100 of FIG. 1 may include at least some of the features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., I²C, etc.). As to microphones, the system 1500 of FIG. 15 may include hardware (e.g., audio card) appropriately configured for receipt of sound (e.g., user voice, ambient sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a first housing that comprises a display, an adjustable microphone and an adjustable camera, wherein the display comprises a normal vector and wherein the adjustable camera comprises an optical axis;

a second housing that comprises a keyboard, a processor and memory accessible to the processor; and a hinge assembly that rotatably couples the first housing and the second housing, wherein rotation of the first housing with respect to the second housing actuates adjustment of the adjustable microphone and wherein rotation of the first housing with respect to the second housing actuates adjustment of the adjustable camera to adjust the optical axis with respect to the normal vector.

2. The system of claim 1, wherein, for a first rotational angle between the first housing and the second housing, the optical axis is parallel to the normal vector and wherein, for a second rotational angle between the first housing and the second housing, the optical axis is not parallel to the normal vector.

3. The system of claim 1, wherein rotation of the first housing with respect to the second housing in a clockwise direction actuates rotational adjustment of the adjustable camera in a counterclockwise direction.

4. The system of claim 1, wherein rotation of the first housing with respect to the second housing in a counterclockwise direction actuates rotational adjustment of the adjustable camera in a clockwise direction.

5. The system of claim 1, wherein the adjustable camera comprises a mechanical coupling to the hinge assembly.

6. The system of claim 5, wherein the mechanical coupling comprises a strand, wherein at least a portion of the strand moves responsive to rotation of the first housing with respect to the second housing.

7. The system of claim 6, wherein the strand comprises a flexible rotatable fiber.

8. The system of claim 6, wherein the strand comprises a slidable band.

9. The system of claim 6, wherein the strand is coupled to a spring-biased spool.

10. The system of claim 5, wherein the mechanical coupling comprises a cam.

11. The system of claim 5, wherein the mechanical coupling comprises at least one permanent magnet.

12. The system of claim 1, wherein the adjustable camera is operatively coupled to an electromagnetic mover.

13. The system of claim 12, wherein a position sensor is operatively coupled to the electromagnetic mover, wherein the position sensor senses a position of the first housing with respect to the second housing.

14. The system of claim 12, wherein the electromagnetic mover is an electric motor.

15. The system of claim 12, comprising control circuitry operatively coupled to the electromagnetic mover.

16. The system of claim 15, wherein the control circuitry operates responsive to instantiation of a video conferencing application via the processor.

17. A system comprising:
a first housing that comprises a display and an adjustable camera, wherein the display comprises a normal vector, wherein the adjustable camera comprises an optical axis;

a second housing that comprises a keyboard, a processor and memory accessible to the processor; and a hinge assembly that rotatably couples the first housing and the second housing, wherein rotation of the first housing with respect to the second housing actuates adjustment of the adjustable camera to adjust the optical axis with respect to the normal vector, wherein the adjustable camera comprises a mechanical coupling to the hinge assembly and wherein the mechanical coupling comprises at least one permanent magnet.

18. A system comprising:
a first housing that comprises a display and an adjustable camera, wherein the display comprises a normal vector, wherein the adjustable camera comprises an optical axis, and wherein the adjustable camera is operatively coupled to an electromagnetic mover;

a second housing that comprises a keyboard, a processor and memory accessible to the processor; and a hinge assembly that rotatably couples the first housing and the second housing, wherein rotation of the first housing with respect to the second housing actuates adjustment of the adjustable camera to adjust the optical axis with respect to the normal vector.

19. The system of claim 18, wherein a position sensor is operatively coupled to the electromagnetic mover, wherein the position sensor senses a position of the first housing with respect to the second housing.

20. The system of claim 18, wherein the electromagnetic mover is an electric motor.

21. The system of claim 18, comprising control circuitry operatively coupled to the electromagnetic mover.

22. The system of claim 21, wherein the control circuitry operates responsive to instantiation of a video conferencing application via the processor.

* * * * *